(12) United States Patent
Shinoda et al.

(10) Patent No.: US 11,598,371 B2
(45) Date of Patent: Mar. 7, 2023

(54) FLUID MACHINE

(71) Applicant: KABUSHIKI KAISHA TOYOTA JIDOSHOKKI, Aichi-ken (JP)

(72) Inventors: Fumiya Shinoda, Kariya (JP); Fumihiro Suzuki, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 17/674,632

(22) Filed: Feb. 17, 2022

(65) Prior Publication Data

US 2022/0275834 A1    Sep. 1, 2022

(30) Foreign Application Priority Data

Feb. 26, 2021   (JP) .............................. JP2021-031163

(51) Int. Cl.
*F16C 33/10*  (2006.01)
*F16C 32/06*  (2006.01)
(Continued)

(52) U.S. Cl.
CPC ...... *F16C 32/0681* (2013.01); *F16C 33/1095* (2013.01); *F16C 35/02* (2013.01);
(Continued)

(58) Field of Classification Search
CPC .... F16C 17/026; F16C 17/045; F16C 17/107; F16C 32/0681; F16C 32/0685; F16C 32/0692; F16C 33/1095; F16C 35/02; F16C 37/002; F16C 2202/04; F16C 2223/80; F16C 2362/52; F01D 25/125; F01D 25/22;
(Continued)

(56) References Cited

U.S. PATENT DOCUMENTS 3,895,689 A * 7/1975 Swearingen ............ F16C 17/04
                                                              184/6.16
5,102,305 A * 4/1992 Bescoby ................. F01D 25/22
                                                              417/407
(Continued)

FOREIGN PATENT DOCUMENTS

GB    2098674 A  * 11/1982  ........... F04D 29/051
GB    2371838 A  *  8/2002  .......... F16C 32/0666
(Continued)

*Primary Examiner* — Phillip A Johnson
(74) *Attorney, Agent, or Firm* — Greenblum & Bernstein, P.L.C.

(57) ABSTRACT

A fluid machine includes a rotating body, an operation body rotated integrally with the rotating body, a housing, hydrodynamic plain bearings rotatably supporting the rotating body relative to the housing, and a cooling passage arranged in the housing. The hydrodynamic plain bearings each include a resin coating layer at a portion that is opposed to the rotating body. The hydrodynamic plain bearings include at least one combination of hydrodynamic plain bearings. Each combination includes an upstream hydrodynamic plain bearing and a downstream hydrodynamic plain bearing located at different positions in a direction in which the fluid flows through the cooling passage. The coating layer of the upstream hydrodynamic plain bearing has a lower hardness than the coating layer of the downstream hydrodynamic plain bearing.

5 Claims, 4 Drawing Sheets

(51) Int. Cl.
*F16C 35/02* (2006.01)
*F16C 37/00* (2006.01)

(52) U.S. Cl.
CPC ........ *F16C 37/002* (2013.01); *F16C 2202/04* (2013.01); *F16C 2223/30* (2013.01); *F16C 2362/52* (2013.01)

(58) Field of Classification Search
CPC . F04D 29/0513; F04D 29/057; F05D 2240/53
See application file for complete search history.

(56) References Cited

U.S. PATENT DOCUMENTS

| | | | |
|---|---|---|---|
| 8,011,880 B2* | 9/2011 | Blumenthal | F16C 33/043 |
| | | | 310/90 |
| 8,882,458 B2* | 11/2014 | Knoop | F04D 29/023 |
| | | | 415/229 |
| 9,151,322 B2* | 10/2015 | Heshmat | F16C 37/002 |
| 9,322,294 B2* | 4/2016 | Lee | F16C 17/024 |
| 9,689,422 B2* | 6/2017 | Yoshino | F02C 6/12 |
| 10,280,796 B2 | 5/2019 | Dall'Ara et al. | |
| 10,962,050 B2* | 3/2021 | Lee | F04D 29/5806 |
| 2020/0011341 A1* | 1/2020 | Martignago | F16C 33/121 |

FOREIGN PATENT DOCUMENTS

| | | | |
|---|---|---|---|
| JP | 2018-510989 A | | 4/2018 |
| JP | 2018-165523 A | | 10/2018 |
| JP | 2019-082195 A | | 5/2019 |
| KR | 20170009510 A | * | 1/2017 |

\* cited by examiner

FLUID MACHINE

BACKGROUND

1. Field

The following description relates to a fluid machine.

2. Description of Related Art

A fluid machine includes a rotating body and an operation body rotated integrally with the rotating body. The fluid machine also includes a housing that accommodates the rotating body and the operation body. Further, the fluid machine includes, for example, hydrodynamic plain bearings. The hydrodynamic plain bearings each rotatably support the rotating body relative to the housing.

Each hydrodynamic plain bearing supporting the rotating body is in contact with the rotating body until the rotation speed of the rotating body reaches a float rotation speed at which the rotating body floats from the hydrodynamic plain bearing. When the rotation speed of the rotating body reaches the float rotation speed, the hydrodynamic pressure generated between the hydrodynamic plain bearing and the rotating body levitates the rotating body from the hydrodynamic plain bearing. Consequently, the rotating body is rotatably supported by the hydrodynamic plain bearing in a non-contact manner.

When the rotation speed of the rotating body is less than the float rotation speed, the hydrodynamic plain bearing supporting the rotating body is in contact with the rotating body. In this case, if, for example, the rotating body applies excessive load to the hydrodynamic plain bearing, seizure may occur in the hydrodynamic plain bearing and the rotating body. Japanese Laid-Open Patent Publication No. 2019-82195 discloses a hydrodynamic plain bearing that includes a resin coating layer applied to a portion that is opposed to the rotating body.

When a rotating body rotates while in contact with a hydrodynamic plain bearing, friction generated between the hydrodynamic plain bearing and the rotating body heats the hydrodynamic plain bearing. Accordingly, a fluid machine may include a cooling passage in its housing through which fluid flows to cool the hydrodynamic plain bearing.

However, when the rotating body rotates while in contact with the coating layer of the hydrodynamic plain bearing, the rotating body will abrade the coating layer and form abrasion particles. As the coating layer of the hydrodynamic plain bearing wears in the cooling passage, the abrasion particles may flow from the hydrodynamic plain bearing together with the fluid and enter the gap between the downstream hydrodynamic plain bearing and the rotating body. The abrasion particles may accelerate wear in the coating layer of the downstream hydrodynamic plain bearing. This shortens the life of the downstream hydrodynamic plain bearing and decreases durability.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fluid machine includes a rotating body, an operation body rotated integrally with the rotating body, a housing accommodating the rotating body and the operation body, hydrodynamic plain bearings rotatably supporting the rotating body relative to the housing, and a cooling passage arranged in the housing. Fluid directly cooling the hydrodynamic plain bearings flows through the cooling passage. The hydrodynamic plain bearings each include a resin coating layer at a portion that is opposed to the rotating body. The hydrodynamic plain bearings include at least one combination of hydrodynamic plain bearings. Each combination includes an upstream hydrodynamic plain bearing and a downstream hydrodynamic plain bearing which are located at different positions in a direction in which the fluid flows through the cooling passage. The coating layer of the upstream hydrodynamic plain bearing has a lower hardness than the coating layer of the downstream hydrodynamic plain bearing.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A fluid machine embodied in a motor-driven compressor 10 will now be described with reference to FIGS. 1 to 4. The motor-driven compressor of the present embodiment is installed in a fuel cell electric vehicle. The fuel cell electric vehicle includes a fuel cell system that supplies oxygen and hydrogen to a vehicle fuel cell to generate power. The motor-driven compressor compresses air containing oxygen supplied to the vehicle fuel cell.

Figure 1:
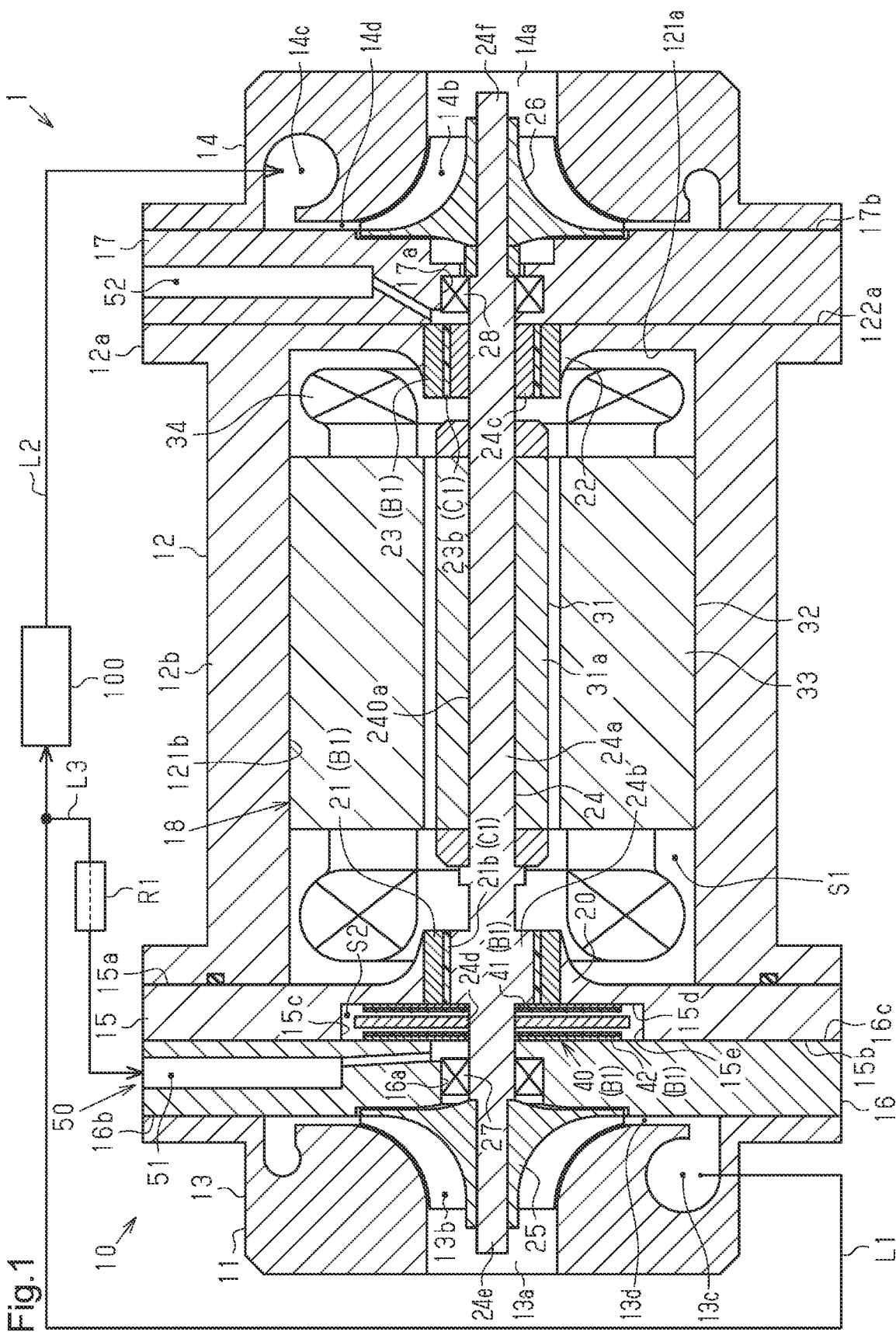
FIG. 1 is a cross-sectional side view illustrating a motor-driven compressor according to one embodiment.

As shown in FIG. 1, the motor-driven compressor 10, which is a fluid machine, includes a housing 11. The housing 11 is made of a metal material (e.g. aluminum). The housing 11 includes a motor housing member 12, a compressor housing member 13, a turbine housing member 14, a first plate 15, a second plate 16, and a third plate 17.

The motor housing member 12 includes a flat end wall 12a and a peripheral wall 12b. The peripheral wall 12b is tubular and extends from the outer circumferential portion of the end wall 12a. The first plate 15 is connected to an open end of the peripheral wall 12b of the motor housing member 12 and closes the open end. The first plate 15 includes an end surface 15a facing the motor housing member 12 and an end surface 15b at the opposite side of the end surface 15a.

A motor compartment S1 is defined by an inner surface 121a of the end wall 12a, a circumferential surface 121b of the peripheral wall 12b, and the end surface 15a of the first plate 15. The motor compartment S1 accommodates an electric motor 18.

The first plate 15 includes a first bearing seat 20. The first bearing seat 20 projects from the central portion of the end surface 15a toward the electric motor 18. The first bearing seat 20 includes a circular through-hole.

The end surface 15b of the first plate 15 includes a recess 15c. The recess 15c includes a circumferential surface 15e. The through-hole of the first bearing seat 20 extends through the first plate 15 and opens in a bottom surface 15d of the recess 15c. The axis of the recess 15c corresponds to the axis of the first bearing seat 20. The circumferential surface 15e of the recess 15c extends between the end surface 15b and the bottom surface 15d.

The motor housing member 12 includes a second bearing seat 22. The second bearing seat 22 projects from the central portion of the inner surface 121a toward the electric motor 18. The second bearing seat 22 includes a circular through-hole. The through-hole of the second bearing seat 22 extends through the end wall 12a and opens in an outer surface 122a of the end wall 12a. The axis of the first bearing seat 20 corresponds to the axis of the second bearing seat 22.

Figure 2:
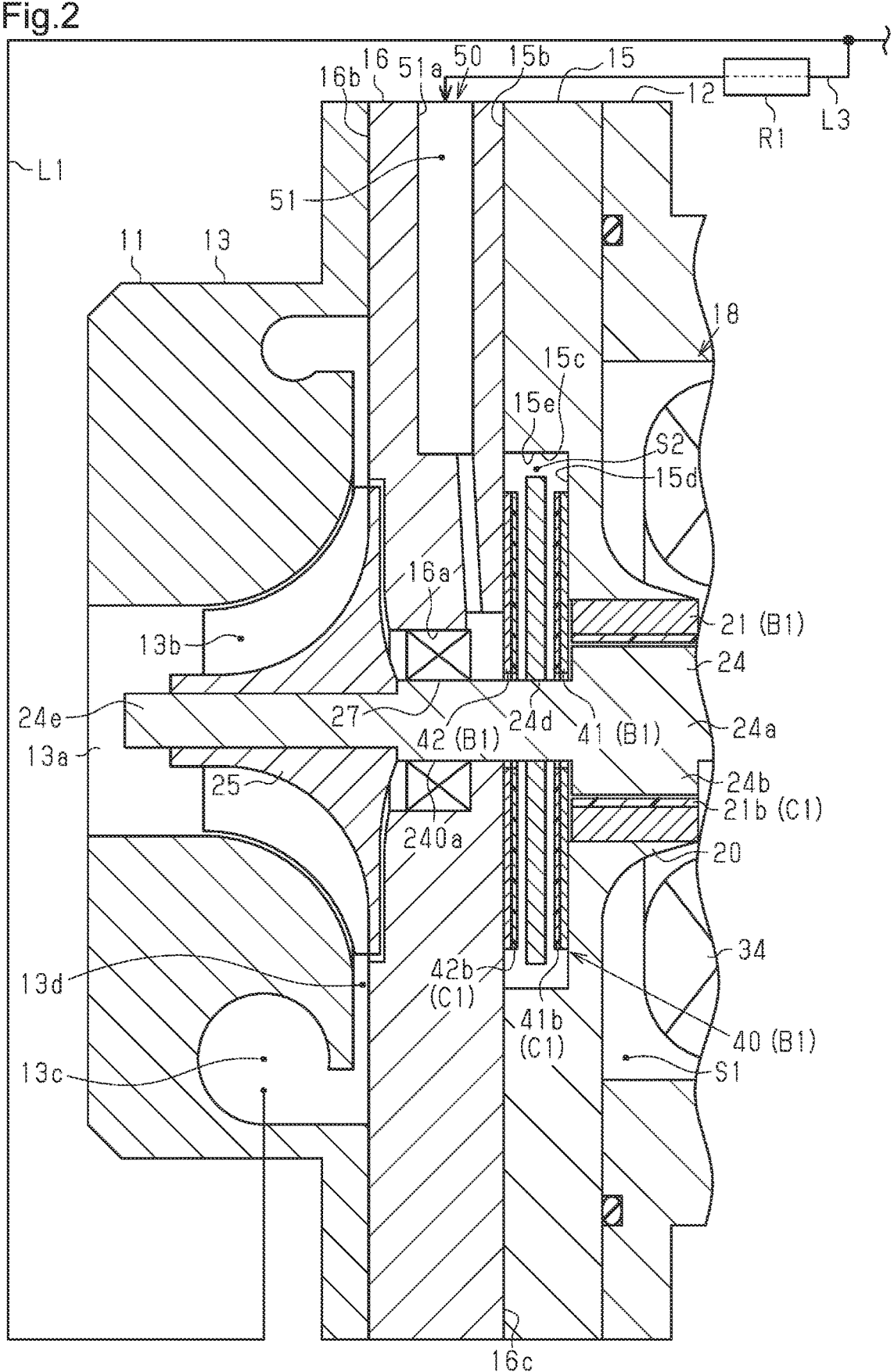
FIG. 2 is an enlarged cross-sectional side view illustrating part of the motor-driven compressor shown in FIG. 1.

As shown in FIG. 2, the second plate 16 is connected to the end surface 15b of the first plate 15. A shaft insertion hole 16a extends through the central portion of the second plate 16. The shaft insertion hole 16a is connected to the recess 15c. The axis of the shaft insertion hole 16a corresponds to the axis of the recess 15c and the axis of the first bearing seat 20. The second plate 16 includes an end surface 16c that is in contact with the first plate 15, and an end surface 16b at the opposite side of the end surface 16c. A thrust bearing accommodation chamber S2 is defined by the end surface 16c of the second plate 16 and the recess 15c of the first plate 15.

The compressor housing member 13, which is tubular, includes a suction port 13a that is a circular hole through which air is drawn. The compressor housing member 13 is connected to the end surface 16b of the second plate 16 so that the axis of the suction port 13a corresponds to the axis of the shaft insertion hole 16a of the second plate 16 and the axis of the first bearing seat 20. The suction port 13a opens in an end surface of the compressor housing member 13 at the side opposite to the second plate 16. A first bladed wheel chamber 13b, a discharge chamber 13c, and a first diffuser passage 13d are arranged between the compressor housing member 13 and the end surface 16b of the second plate 16. The first bladed wheel chamber 13b is connected to the suction port 13a. The discharge chamber 13c extends about the axis of the suction port 13a near the first bladed wheel chamber 13b. The first diffuser passage 13d connects the first bladed wheel chamber 13b to the discharge chamber 13c. The first bladed wheel chamber 13b is connected to the shaft insertion hole 16a of the second plate 16.

Figure 3:
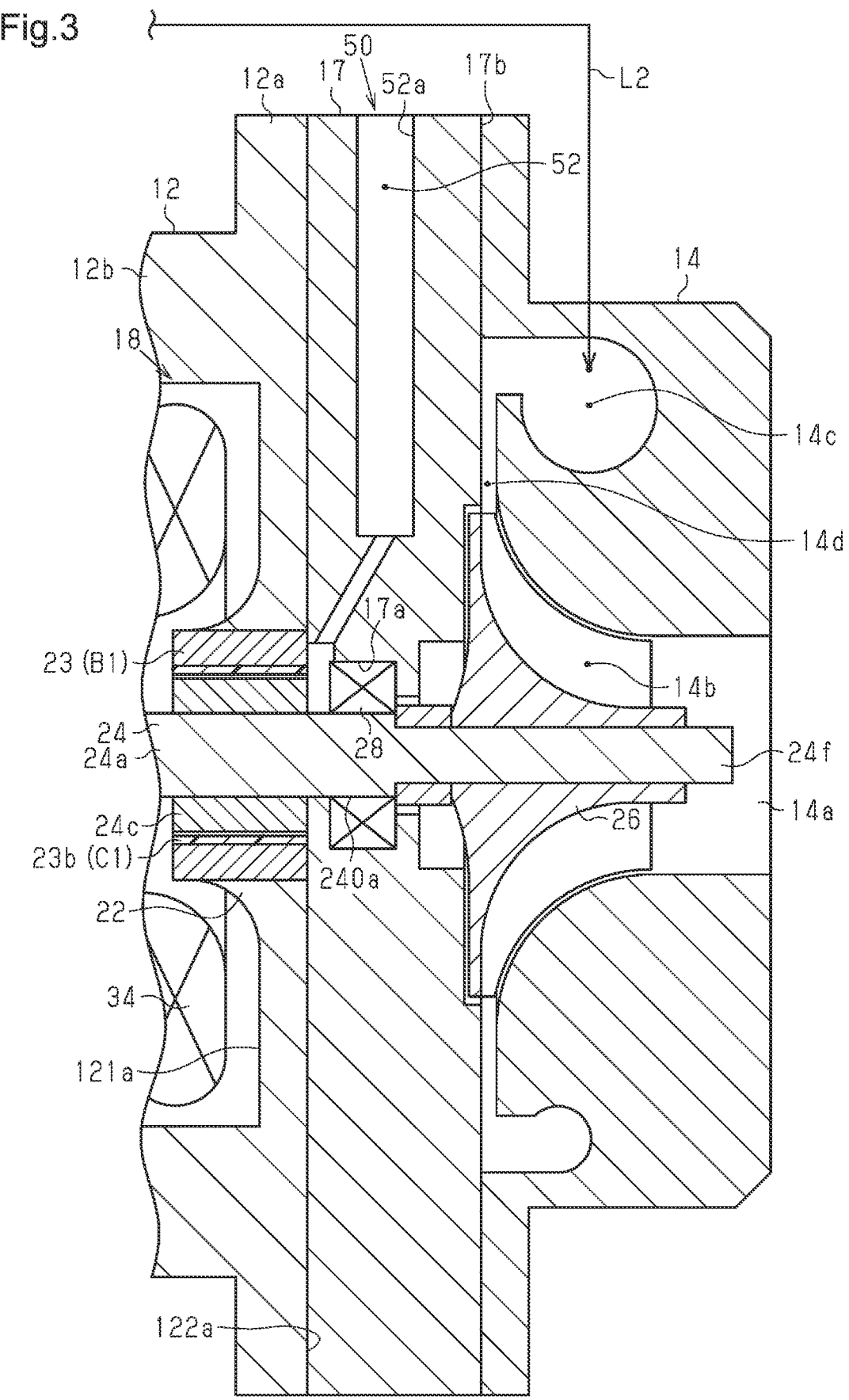
FIG. 3 is an enlarged cross-sectional side view illustrating part of the motor-driven compressor shown in FIG. 1.

As shown in FIG. 3, the third plate 17 is connected to the outer surface 122a of the end wall 12a. The third plate 17 includes a shaft insertion hole 17a that extends through the central portion of the third plate 17. The third plate 17 further includes an end surface 17b that is in contact with the turbine housing member 14. The shaft insertion hole 17a is connected to the through-hole of the second bearing seat 22. The axis of the shaft insertion hole 17a corresponds to the axis of the second bearing seat 22.

The turbine housing member 14, which is tubular, includes a discharge port 14a that is a circular hole through which air is discharged. The turbine housing member 14 is connected to the end surface 17b of the third plate 17 so that the axis of the discharge port 14a corresponds to the axis of the shaft insertion hole 17a of the third plate 17 and the axis of the second bearing seat 22. The discharge port 14a opens in an end surface of the turbine housing member 14 at the side opposite to the third plate 17. A second bladed wheel chamber 14b, an intake chamber 14c, and a second diffuser passage 14d are arranged between the turbine housing member 14 and the end surface 17b of the third plate 17. The second bladed wheel chamber 14b is connected to the discharge port 14a. The intake chamber 14c extends about the axis of the discharge port 14a near the second bladed wheel chamber 14b. The second diffuser passage 14d connects the second bladed wheel chamber 14b to the intake chamber 14c. The second bladed wheel chamber 14b is connected to the shaft insertion hole 17a.

As shown in FIG. 1, the housing 11 accommodates a rotating body 24. The rotating body 24 includes a rotary shaft 24a, which is a shaft portion, a first support portion 24b, a second support portion 24c, and a third support portion 24d, which is an increased diameter portion. The first support portion 24b is located toward a first end 24e of the rotary shaft 24a and arranged along a circumferential surface 240a of the rotary shaft 24. The first support portion 24b is arranged inside the through-hole of the first bearing seat 20. The first support portion 24b is formed integrally with the rotary shaft 24a to project from the circumferential surface 240a.

The second support portion 24c is located toward a second end 24f of the rotary shaft 24a and arranged along the circumferential surface 240a. The second support portion 24c is arranged inside the through-hole of the second bearing seat 22. The second support portion 24c is annular and fixed to the circumferential surface 240a to project from the circumferential surface 240a. The second support portion 24c is rotatable integrally with the rotary shaft 24a.

The third support portion 24d is arranged in the thrust bearing accommodation chamber S2. The third support portion 24d is annular and fixed to the circumferential surface 240a to project from the circumferential surface 240a. The third support portion 24d is separate from the rotary shaft 24a. The third support portion 24d is rotatable integrally with the rotary shaft 24a. The third support portion 24d is located at a position distant from the electric motor 18 in the axial direction of the rotating body 24.

The first end 24e of the rotating body 24 is connected to a first bladed wheel 25, which serves as an operation body. The first bladed wheel 25 arranged on the rotary shaft 24a is located toward the first end 24e from the third support portion 24d. The first bladed wheel 25 is accommodated in the first bladed wheel chamber 13b. The second end 24f of the rotating body 24 is connected to a second bladed wheel 26, which serves as an operation body. The second bladed wheel 26 arranged on the rotary shaft 24a is located toward the second end 24f from the second support portion 24c. The second bladed wheel 26 is accommodated in the second bladed wheel chamber 14b. Thus, the housing 11 accommodates the first bladed wheel 25, the second bladed wheel 26, and the rotating body 24. The electric motor 18 is arranged between the first bladed wheel 25 and the second bladed wheel 26 in the axial direction of the rotating body 24.

An annular first sealing member 27 extending around the rotating body 24 is arranged in the shaft insertion hole 16a of the second plate 16. The first sealing member 27 prevents air leakage from the first bladed wheel chamber 13b to the motor compartment S1. An annular second sealing member 28 extending around the rotating body 24 is arranged in the shaft insertion hole 17a of the third plate 17. The second sealing member 28 prevents air leakage from the second bladed wheel chamber 14b to the motor compartment S1. The first sealing member 27 and the second sealing member 28 are, for example, sealing rings.

The electric motor 18 includes a tubular rotor 31 and a tubular stator 32. The rotor 31 is fixed to the rotary shaft 24a. The stator 32 is fixed to the housing 11. The rotor 31 is located inward from the stator 32 in the radial direction and rotated integrally with the rotating body 24. The rotor 31 includes a cylindrical rotor core 31a fixed to the rotary shaft 24a and permanent magnets (not shown) arranged in the rotor core 31a. The stator 32 surrounds the rotor 31. The stator 32 includes a cylindrical stator core 33 fixed to the circumferential surface 121b and a coil 34 wound around the stator core 33. The rotating body 24 rotates integrally with the rotor 31 when current flows from a battery (not shown) through the coil 34. Thus, the electric motor 18 rotates the rotating body 24. The electric motor 18 is a drive source for rotating the rotating body 24.

A fuel cell system 1 includes a fuel cell stack 100, which serves as a vehicle fuel cell, the motor-driven compressor 10, a supply passage L1, a discharge passage L2, and a branch passage L3. The fuel cell stack 100 includes fuel cells. The supply passage L1 connects the discharge chamber 13c to the fuel cell stack 100. The discharge passage L2 connects the fuel cell stack 100 to the intake chamber 14c.

When the rotating body 24 rotates integrally with the rotor 31, the first bladed wheel 25 and the second bladed wheel 26 rotate integrally with the rotating body 24. Then, air drawn through the suction port 13a is compressed by the first bladed wheel 25 inside the first bladed wheel chamber 13b. The compressed air passes through the first diffuser passage 13d and is discharged from the discharge chamber 13c. The air discharged from the discharge chamber 13c is supplied through the supply passage L1 to the fuel cell stack 100. The air supplied to the fuel cell stack 100 is used for power generation in the fuel cell stack 100. Emission from the fuel cell stack 100 is discharged into the discharge passage L2. The emission from the fuel cell stack 100 is drawn through the discharge passage L2 into the intake chamber 14c. The emission drawn into the intake chamber 14c is discharged through the second diffuser passage 14d into the second bladed wheel chamber 14b. The emission discharged into the second bladed wheel chamber 14b rotates the second bladed wheel 26. The rotating body 24 is driven by the electric motor 18 and rotated by the second bladed wheel 26, which is rotated by the emission from the fuel cell stack 100. Thus, the first bladed wheel 25 and the second bladed wheel 26 are operation bodies rotated integrally with the rotating body 24. The operation bodies include the first bladed wheel 25 and the second bladed wheel 26. The second bladed wheel 26 rotated by the emission from the fuel cell stack 100 assists rotation of the rotating body 24. The emission discharged from the fuel cell stack 100 into the intake chamber 14c is discharged out of the discharge port 14a.

The motor-driven compressor 10 includes hydrodynamic plain bearings B1. The hydrodynamic plain bearings B1 rotatably support the rotating body 24 relative to the housing 11. The hydrodynamic plain bearings B1 include a first hydrodynamic radial bearing 21, a second hydrodynamic radial bearing 23, and a hydrodynamic thrust bearing 40. The first hydrodynamic radial bearing 21 and the second hydrodynamic radial bearing 23 rotatably support the rotating body 24 in the radial direction. The radial direction is orthogonal to the axial direction of the rotating body 24.

As shown in FIG. 2, the first hydrodynamic radial bearing 21 is cylindrical. The first hydrodynamic radial bearing 21 is held by the first bearing seat 20. Thus, the first hydrodynamic radial bearing 21 is located toward the first end 24e of the rotating body 24 from the electric motor 18. The first hydrodynamic radial bearing 21 supports the first support portion 24b of the rotating body 24.

The first hydrodynamic radial bearing 21 is in contact with the first support portion 24b to support the rotating body 24 until the rotation speed of the rotating body 24 reaches a float rotation speed at which the rotating body 24 floats from the first hydrodynamic radial bearing 21. When the rotation speed of the rotating body 24 reaches the float rotation speed, the hydrodynamic pressure of an air film generated between the first support portion 24b and the first hydrodynamic radial bearing 21 levitates the first support portion 24b from the first hydrodynamic radial bearing 21. The first hydrodynamic radial bearing 21 supports the rotating body 24 without contacting the first support portion 24b. Thus, the first hydrodynamic radial bearing 21 is a gas bearing.

As shown in FIG. 3, the second hydrodynamic radial bearing 23 is cylindrical. The second hydrodynamic radial bearing 23 is held by the second bearing seat 22. Thus, the second hydrodynamic radial bearing 23 is located toward the second end 24f of the rotating body 24 from the electric motor 18. The second hydrodynamic radial bearing 23 supports the second support portion 24c of the rotating body 24.

The second hydrodynamic radial bearing 23 is in contact with the second support portion 24c to support the rotating body 24 until the rotation speed of the rotating body 24 reaches the float rotation speed at which the rotating body 24 floats from the second hydrodynamic radial bearing 23. When the rotation speed of the rotating body 24 reaches the float rotation speed, the hydrodynamic pressure of an air film generated between the second support portion 24c and the second hydrodynamic radial bearing 23 levitates the second support portion 24c from the second hydrodynamic radial bearing 23. The second hydrodynamic radial bearing 23 supports the rotating body 24 without contacting the second support portion 24c. Thus, the second hydrodynamic radial bearing 23 is a gas bearing.

As shown in FIG. 2, the hydrodynamic thrust bearing 40 rotatably supports the rotating body 24 in the thrust direction. The thrust direction is the axial direction of the rotating body 24.

The hydrodynamic thrust bearing 40 includes a first hydrodynamic thrust bearing 41 and a second hydrodynamic thrust bearing 42. The first hydrodynamic thrust bearing 41 and the second hydrodynamic thrust bearing 42 are arranged in the thrust bearing accommodation chamber S2. The third support portion 24d is arranged between the first hydrodynamic thrust bearing 41 and the second hydrodynamic thrust bearing 42. The first hydrodynamic thrust bearing 41 and the second hydrodynamic thrust bearing 42 are opposed to the third support portion 24d in the axial direction of the rotating body 24.

The first hydrodynamic thrust bearing 41 is in contact with the third support portion 24d to support the rotating body 24 until the rotation speed of the rotating body 24 reaches the float rotation speed at which the rotating body 24 floats from the first hydrodynamic thrust bearing 41. When the rotation speed of the rotating body 24 reaches the float rotation speed, the hydrodynamic pressure of an air film generated between the third support portion 24d and the first hydrodynamic thrust bearing 41 levitates the third support portion 24d from the first hydrodynamic thrust bearing 41. The first hydrodynamic thrust bearing 41 supports the rotating body 24 without contacting the third support portion 24d. Thus, the first hydrodynamic thrust bearing 41 is a gas bearing. The first hydrodynamic thrust bearing 41 rotatably supports the side of the third support portion 24d that is located toward the electric motor 18 in the axial direction of the rotating body 24.

The second hydrodynamic thrust bearing 42 is in contact with the third support portion 24d to support the rotating body 24 until the rotation speed of the rotating body 24 reaches the float rotation speed at which the rotating body 24 floats from the second hydrodynamic thrust bearing 42. When the rotation speed of the rotating body 24 reaches the float rotation speed, the hydrodynamic pressure of an air film generated between the third support portion 24d and the second hydrodynamic thrust bearing 42 levitates the third support portion 24d from the second hydrodynamic thrust bearing 42. The second hydrodynamic thrust bearing 42 supports the rotating body 24 without contacting the third support portion 24d. Thus, the second hydrodynamic thrust bearing 42 is a gas bearing. The second hydrodynamic thrust bearing 42 rotatably supports the side of the third support portion 24d that is located opposite to the electric motor 18 in the axial direction of the rotating body 24.

The first hydrodynamic thrust bearing 41 rotatably supports the rotating body 24 in the thrust direction. The second hydrodynamic thrust bearing 42 rotatably supports the rotating body 24 in the thrust direction. Thus, the hydrodynamic thrust bearing 40 receives the differential pressure of the first bladed wheel 25 and the second bladed wheel 26.

The hydrodynamic plain bearings B1 include resin coating layers C1 at portions opposed to the rotating body 24. The coating layers C1 are formed from a base material and powdered solid lubricant (not shown). The base material contains a binder resin and a reinforcing material. The binder resin is, for example, polyamide-imide resin. The reinforcing material is, for example, titanium dioxide. The solid lubricant is, for example, molybdenum disulfide.

The coating layers C1 include a first radial coating layer 21b, arranged at a portion of the first hydrodynamic radial bearing 21 that is opposed to the first support portion 24b, and a second radial coating layer 23b, arranged at a portion of the second hydrodynamic radial bearing 23 that is opposed to the second support portion 24c. The coating layers C1 further include a first thrust coating layer 41b, arranged at a portion of the first hydrodynamic thrust bearing 41 that is opposed to the third support portion 24d, and a second thrust coating layer 42b, arranged at a portion of the second hydrodynamic thrust bearing 42 that is opposed to the third support portion 24d.

As shown in FIGS. 1 to 3, the housing 11 includes a cooling passage 50. Air, which is a fluid, flows through the cooling passage 50. Thus, the fluid flowing through the cooling passage 50 is gas. The cooling passage 50 extends through the second plate 16, the first plate 15, the motor housing member 12, and the third plate 17. The cooling passage 50 includes a first passage 51 and a second passage 52.

The first passage 51 is arranged in the second plate 16. The first passage 51 includes an inlet 51a that opens in a circumferential surface of the second plate 16. The first passage 51 is connected to the thrust bearing accommodation chamber S2.

The second passage 52 is arranged in the third plate 17. The second passage 52 includes a discharge port 52a that opens in the circumferential surface of the third plate 17. The second passage 52 is connected via the second hydrodynamic radial bearing 23 and the second support portion 24c to the motor compartment S1.

The branch passage L3 branches from the supply passage L1. The branch passage L3 connects the supply passage L1 to the inlet 51a of the first passage 51. An intercooler R1 is arranged in the branch passage L3. The intercooler R1 cools air flowing through the branch passage L3.

A portion of the air flowing through the supply passage L1 toward the fuel cell stack 100 enters the first passage 51 via the branch passage L3. The air entering the first passage 51 is cooled by the intercooler R1 when flowing through the branch passage L3. The air entering the first passage 51 flows sequentially through the gap between the second hydrodynamic thrust bearing 42 and the rotary shaft 24a, the gap between the second hydrodynamic thrust bearing 42 and the third support portion 24d, the gap between the circumferential surface 15e of the recess 15c and the third support portion 24d, the gap between the first hydrodynamic thrust bearing 41 and the third support portion 24d, and the gap between the first hydrodynamic thrust bearing 41 and the rotary shaft 24a. Then, the air flows through the gap between the first hydrodynamic radial bearing 21 and the first support portion 24b and enters the motor compartment S1. The air entering the motor compartment S1 flows, for example, through the gap between the rotor 31 and the stator 32 into the gap between the second hydrodynamic radial bearing 23 and the second support portion 24c. The air then flows from the gap between the second hydrodynamic radial bearing 23 and the second support portion 24c into the second passage 52 and is discharged from the discharge port 52a. Thus, the cooling passage 50 is formed by the first passage 51, the gap between the second hydrodynamic thrust bearing 42 and the rotary shaft 24a, the gap between the second hydrodynamic thrust bearing 42 and the third support portion 24d, the gap between the circumferential surface 15e of the recess 15c and the third support portion 24d, the gap between the first hydrodynamic thrust bearing 41 and the third support portion 24d, the gap between the first hydrodynamic thrust bearing 41 and the rotary shaft 24a, the gap between the first hydrodynamic radial bearing 21 and the first support portion 24b, the motor compartment S1, the gap between the second hydrodynamic radial bearing 23 and the second support portion 24c, and the second passage 52.

In this manner, air flowing through the cooling passage 50 directly cools the electric motor 18, the first hydrodynamic radial bearing 21, the second hydrodynamic radial bearing 23, the first hydrodynamic thrust bearing 41, and the second hydrodynamic thrust bearing 42. A portion of the air flowing toward the fuel cell stack 100 flows into the cooling passage 50 as gas that flows through the cooling passage 50. The cooling passage 50 is arranged in the housing 11 so that the air flowing through the cooling passage 50 flows sequentially to the second hydrodynamic thrust bearing 42, the first hydrodynamic thrust bearing 41, the first hydrodynamic radial bearing 21, and the second hydrodynamic radial bearing 23 in series.

The second thrust coating layer 42b has a lower hardness than the first thrust coating layer 41b. The hardness of the first thrust coating layer 41b is lower than that of the first radial coating layer 21b. The hardness of the first radial coating layer 21b is lower than that of the second radial coating layer 23b.

Thus, the hardness of the second thrust coating layer 42b is lower than the hardness of the first thrust coating layer 41b, the hardness of the first radial coating layer 21b, and the hardness of the second radial coating layer 23b. The hardness of the first thrust coating layer 41b is lower than the hardness of the first radial coating layer 21b, and the hardness of the second radial coating layer 23b. The hardness of the first radial coating layer 21b is lower than the hardness of the second radial coating layer 23b. This allows the formation of at least one combination of two, for example, six combinations of two of the hydrodynamic plain bearings B1. Each combination includes an upstream hydrodynamic plain bearing B1 and a downstream hydrodynamic plain bearing B1 located at different positions in the direction in which air flows through the cooling passage 50. The hardness of the coating layer C1 of the upstream hydrodynamic plain bearing B1 is lower than the hardness of the coating layer C1 of the downstream hydrodynamic plain bearing B1. The hardness of the coating layers C1 is adjusted by the hardness of the base material, the content of the solid lubricant, and the particle size of the solid lubricant.

Figure 4:
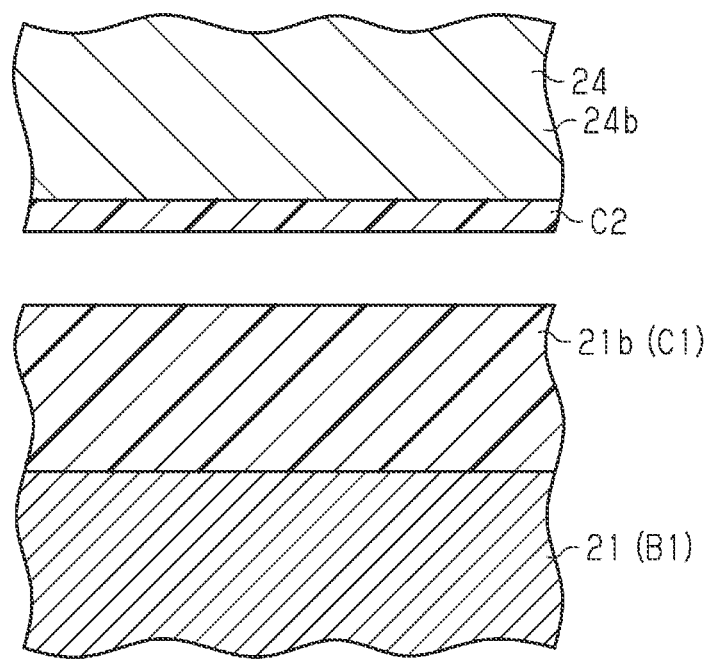
FIG. 4 is an enlarged cross-sectional view illustrating a rotating body and a coating layer of a hydrodynamic plain bearing.

Referring to FIG. 4, when the rotating body 24 is rotated while in contact with the first radial coating layer 21b, the first support portion 24b slides on the first radial coating layer 21b. In this case, part of the first radial coating layer 21b is abraded by the first support portion 24b and the abraded part of the first radial coating layer 21b may collect and form a transferred layer C2 on a portion of the first support portion 24b that is opposed to the first hydrodynamic radial bearing 21. The hardness of the transferred layer C2 formed in this manner will have the same hardness as the first radial coating layer 21b. This reduces wear of the first radial coating layer 21b in comparison with when the first support portion 24b that does not include the transferred layer C2 is rotated while in direct contact with the first radial coating layer 21b.

The transferred layer C2 may also be formed in the same manner on the part of the second support portion 24c that is opposed to the second hydrodynamic radial bearing 23, the part of the third support portion 24d that is opposed to the first hydrodynamic thrust bearing 41, and the part of the third support portion 24d that is opposed to the second hydrodynamic thrust bearing 42.

Operation

The operation of the present embodiment will now be described.

When the rotating body 24 rotates while in contact with the coating layer C1 of the hydrodynamic plain bearing B1, the rotating body 24 abrades the coating layer C1 and generates abrasion particles from the coating layer C1. When abrasion particles are generated from the coating layer C1 of the hydrodynamic plain bearing B1 arranged in the passage where air flows, the abrasion particles may be carried by the flowing air and enter the gap between the downstream hydrodynamic plain bearing B1 and the rotating body 24.

In the present disclosure, the hardness of the coating layer C1 of the upstream hydrodynamic plain bearing B1 is lower than the hardness of the coating layer C1 of the downstream hydrodynamic plain bearing B1. Thus, the hardness of the abrasion particles generated from the coating layer C1 of the upstream hydrodynamic plain bearing B1 is lower than the hardness of the coating layer C1 of the downstream hydrodynamic plain bearing B1. Thus, even when abrasion particles of the coating layer C1 of the upstream hydrodynamic plain bearing B1 carried by the flowing air enters the gap between the rotating body 24 and a downstream hydrodynamic plain bearing B1, wear will be limited in the coating layer C1 of the downstream hydrodynamic plain bearing B1.

Advantages

The above-described embodiment has the following advantages.

(1) The hydrodynamic plain bearings B1 include at least one combination of two hydrodynamic plain bearings B1. Each combination includes an upstream hydrodynamic plain bearing B1 and a downstream hydrodynamic plain bearing B1 located at different positions in the direction in which air flows through the cooling passage 50. The hardness of the coating layer C1 of the upstream hydrodynamic plain bearing B1 is lower than the hardness of the coating layer C1 of the downstream hydrodynamic plain bearing B1. Thus, the hardness of the abrasion particles generated from the coating layer C1 of the upstream hydrodynamic plain bearing B1 is lower than the hardness of the coating layer C1 of the downstream hydrodynamic plain bearing B1. Consequently, even when abrasion particles from the coating layer C1 of the upstream hydrodynamic plain bearing B1 carried by the flow of air enters the gap between the rotating body 24 and the downstream hydrodynamic plain bearings B1, wear will be limited in the coating layer C1 of the downstream hydrodynamic plain bearings B1.

The upstream hydrodynamic plain bearing B1 is cooled more readily than the downstream hydrodynamic plain bearing B1 by the air flowing through the cooling passage 50. Thus, even if the hardness of the coating layer C1 of the upstream hydrodynamic plain bearing B1 is lower than the hardness of the coating layer C1 of the downstream hydrodynamic plain bearing B1, abrasion particles generated from the coating layer C1 of the upstream hydrodynamic plain bearing B1 will be limited. This improves the durability of the motor-driven compressor 10.

(2) The electric motor 18 is cooled by the air used to cool the first hydrodynamic radial bearing 21, the second hydrodynamic radial bearing 23, the first hydrodynamic thrust bearing 41, and the second hydrodynamic thrust bearing 42. This eliminates the need for a separate cooling passage used to cool the electric motor 18 with air and simplifies the structure of the motor-driven compressor 10.

(3) The hardness of the coating layer C1 of the upstream hydrodynamic plain bearing B1 is lower than the hardness of the coating layer C1 of the downstream hydrodynamic plain bearing B1 to restrict wear of the coating layer C1 of the downstream hydrodynamic plain bearing B1. This eliminates the need for a filter that captures abrasion particles generated from, for example, the coating layer C1 of an upstream hydrodynamic plain bearing B1 before the abrasion particles enter the gap between the rotating body 24 and a downstream hydrodynamic plain bearing B1. This minimizes the number of components.

(4) The cooling passage 50 is arranged in the housing 11 so that the air flowing through the cooling passage 50 flows sequentially to the second hydrodynamic thrust bearing 42, the first hydrodynamic thrust bearing 41, the first hydrodynamic radial bearing 21, and the second hydrodynamic radial bearing 23 in series. This simplifies the route of the cooling passage 50 in comparison with when the cooling passage 50 is arranged in the housing 11 so that the air flowing through the cooling passage 50 flows to the second hydrodynamic thrust bearing 42, the first hydrodynamic thrust bearing 41, the first hydrodynamic radial bearing 21, and the second hydrodynamic radial bearing 23 in parallel.

(5) The cooling passage 50 is formed to cool the electric motor 18 with the air flowing sequentially to the second hydrodynamic thrust bearing 42, the first hydrodynamic thrust bearing 41, the first hydrodynamic radial bearing 21, and the second hydrodynamic radial bearing 23 in series. This simplifies the structure of the cooling passage 50 that uses the air cooling the bearings 21, 23, 41, and 42 to cool the electric motor 18.

(6) A portion of the air flowing toward the fuel cell stack 100 flows into the cooling passage 50 as gas that flows through the cooling passage 50. Thus, air for the fuel cell stack 100 is used to cool the bearings 21, 23, 41, and 42. This simplifies the structure of the vehicle in which the fuel cell stack 100 is installed.

Modifications

The above-described embodiments may be modified as follows. The above-described embodiments and the following modifications can be combined as long as the combined modifications remain technically consistent with each other.

The fluid does not need to be air. Oil may be used as the fluid. In this case, when the rotation speed of the rotating body 24 reaches the float rotation speed, the hydrodynamic pressure of, for example, an oil film generated between the first support portion 24b and the first hydrodynamic radial bearing 21 levitates the first support portion 24b from the first hydrodynamic radial bearing 21.

The fluid machine does not need to include the electric motor 18. In this case, for example, an engine may be used as a drive source for rotating the rotating body 24.

The first thrust coating layer 41b, the first radial coating layer 21b, and the second radial coating layer 23b may have, for example, the same hardness. Alternatively, the first thrust coating layer 41b and the second thrust coating layer 42b may have the same hardness, and the first radial coating layer 21b and the second radial coating layer 23b may have the same hardness. In this case, the hardness of the thrust coating layers 41b, 42b is lower than the hardness of the radial coating layers 21b, 23b. In other words, at least two hydrodynamic plain bearings B1 are located at different positions with respect to the flow direction of the cooling passage 50, and the hardness of one of the two hydrodynamic plain bearings B1 is lower than the hardness of the downstream one of the hydrodynamic plain bearings B1.

In the embodiment, the cooling passage 50 is arranged in the housing 11 so that the air flowing through the cooling passage 50 flows sequentially to the second hydrodynamic thrust bearing 42, the first hydrodynamic thrust bearing 41, the first hydrodynamic radial bearing 21, and the second hydrodynamic radial bearing 23 in series. Instead, the cooling passage 50 arranged in the housing 11 may include a passage through which the air flowing through the cooling passage 50 flows sequentially to the second hydrodynamic thrust bearing 42 and the first hydrodynamic thrust bearing 41 in series and a passage through which the air flowing through the cooling passage 50 flows sequentially to the first hydrodynamic radial bearing 21 and the second hydrodynamic radial bearing 23 in series.

Other types of thrust bearings, for example, a hydrostatic thrust bearing may be used to support the rotating body 24 in the thrust direction.

Other types of radial bearings, for example, a hydrostatic radial bearing may be used to support the rotating body 24 in the radial direction.

The hydrodynamic radial bearings 21, 23 may be arranged at the upstream side of the hydrodynamic thrust bearings 41, 42 in the direction in which air flows. Alternatively, the hydrodynamic radial bearings 21, 23 may be arranged between the first hydrodynamic thrust bearing 41 and the second hydrodynamic thrust bearing 42 in the direction in which air flows. In other words, the first hydrodynamic radial bearing 21, the second hydrodynamic radial bearing 23, the first hydrodynamic thrust bearing 41, and the second hydrodynamic thrust bearing 42 may be located at any position as long as the durability of the motor-driven compressor 10 can be improved.

The hardness of one of the thrust coating layers 41b, 42b that receives a larger thrust load when the rotating body 24 is rotated may be higher than the hardness of the other one of the thrust coating layers 41b, 42b that receives a smaller thrust load when the rotating body 24 is rotated.

When, for example, the hardness of the coating layer C1 of the hydrodynamic thrust bearing 40 that receives a larger thrust load when the rotating body 24 is rotated is the same as the hardness of the coating layer C1 of the hydrodynamic thrust bearing 40 that receives a smaller thrust load when the rotating body 24 is rotated, the load applied to the coating layer C1 of the hydrodynamic thrust bearing 40 increases as the thrust load received when the rotating body 24 is rotated increases. Thus, the durability of the hydrodynamic thrust bearing 40 that receives a larger thrust load when the rotating body 24 is rotated is more likely to be lower than the durability of the hydrodynamic thrust bearing 40 that receives a smaller thrust load when the rotating body 24 is rotated. Thus, the hardness of the one of the first thrust coating layer 41b and the second thrust coating layer 42b that receives a larger thrust load when the rotating body 24 is rotated is higher than the hardness of the other one of the first thrust coating layer 41b and the second thrust coating layer 42b that receives a smaller thrust load when the rotating body 24 is rotated. This reduces abrasion of the one of the thrust coating layers 41b, 42b that receives a larger thrust load when the rotating body 24 is rotated and improves the durability of the motor-driven compressor 10.

In this case, the one of the hydrodynamic thrust bearings 41, 42 that receives a larger thrust load when the rotating body 24 is rotated may be arranged at the upstream side of the other one of the hydrodynamic thrust bearings 41, 42 that receives a smaller thrust load when the rotating body 24 is rotated in the direction in which air flows.

The material of the coating layers C1 may be changed. The solid lubricant may be tungsten disulfide. In this manner, the hardness of the coating layers C1 may be changed to improve the durability of the motor-driven compressor 10.

In the embodiment, the first support portion 24b is formed integrally with the rotary shaft 24a. Instead, the first support portion 24b may be separate from the rotary shaft 24a.

The third support portion 24d may be formed integrally with the rotary shaft 24a.

The motor-driven compressor 10 does not need to include the second bladed wheel 26.

The gas flowing through the cooling passage 50 does not need to be air. For example, refrigerant gas may be used.

In the embodiment, a portion of the air flowing toward the fuel cell stack 100 flows into the cooling passage 50 as gas that flows through the cooling passage 50. However, the air flowing through the cooling passage 50 may be separate from the air flowing toward the fuel cell stack 100.

The first sealing member 27 and the second sealing member 28 do not need to be sealing rings. Instead, the first sealing member 27 and the second sealing member 28 may be labyrinth seals.

In the motor-driven compressor 10, fluid compressed by the first bladed wheel 25 may be further compressed by the second bladed wheel 26.

Fluid compressed by first bladed wheel 25 and the second bladed wheel 26 does not need to be air. Thus, the motor-driven compressor 10 can be applied to any device and may compress any fluid. For example, the motor-driven compressor 10 can be used for an air conditioner and may compress refrigerant as fluid. The motor-driven compressor 10 may be installed in any structure other than a vehicle.

The fluid machine may be a scroll compressor having a scroll mechanism in which an operation body operates in accordance with rotation of the rotating body 24. The fluid machine may be a Roots pump including two rotors as operation bodies.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fluid machine, comprising:
   a rotating body;
   an operation body rotated integrally with the rotating body;
   a housing accommodating the rotating body and the operation body;
   hydrodynamic plain bearings rotatably supporting the rotating body relative to the housing; and
   a cooling passage arranged in the housing, wherein a fluid directly cooling the hydrodynamic plain bearings flows through the cooling passage, wherein
   the hydrodynamic plain bearings each include a resin coating layer at a portion that is opposed to the rotating body,
   the hydrodynamic plain bearings include at least one combination of hydrodynamic plain bearings, wherein each combination includes an upstream hydrodynamic plain bearing and a downstream hydrodynamic plain bearing located at different positions in a direction in which the fluid flows through the cooling passage, and
   the coating layer of the upstream hydrodynamic plain bearing has a lower hardness than the coating layer of the downstream hydrodynamic plain bearing.

2. The fluid machine according to claim 1, wherein the fluid flowing through the cooling passage is a gas, and the hydrodynamic plain bearings each include a gas bearing.

3. The fluid machine according to claim 2, wherein the operation body includes:
   a first bladed wheel arranged on a first end of the rotating body in an axial direction of the rotating body; and
   a second bladed wheel arranged at a second end of the rotating body in the axial direction of the rotating body,
   the fluid machine further comprises an electric motor arranged between the first bladed wheel and the second bladed wheel in the axial direction, the electric motor being configured to rotate the rotating body,
   the gas bearings include:
   a first hydrodynamic radial bearing located toward the first end of the rotating body from the electric motor;
   a second hydrodynamic radial bearing located toward the second end of the rotating body from the electric motor; and
   one or more hydrodynamic thrust bearings that receive a differential pressure difference of the first bladed wheel and the second bladed wheel, and
   the gas cools the first hydrodynamic radial bearing, the second hydrodynamic radial bearing, the one or more hydrodynamic thrust bearings, and the electric motor.

4. The fluid machine according to claim 3, wherein the rotating body includes:
   a shaft portion; and
   an annular increased diameter portion that projects from a circumferential surface of the shaft portion and rotates integrally with the shaft portion,
   the increased diameter portion is arranged at a position spaced from the electric motor in the axial direction,
   the one or more hydrodynamic thrust bearings include:
   a first hydrodynamic thrust bearing rotatably supporting a part of the increased diameter portion that is located toward the electric motor in the axial direction; and
   a second hydrodynamic thrust bearing rotatably supporting a part of the increased diameter portion that is located at a side opposite to the electric motor in the axial direction, and
   one of the coating layer of the first hydrodynamic thrust bearing and the coating layer of the second hydrodynamic thrust bearing that receives a larger thrust load when the rotating body is rotated has a higher hardness than the other one of the coating layer of the first hydrodynamic thrust bearing and the coating layer of the second hydrodynamic thrust bearing that receives a smaller thrust load when the rotating body is rotated.

5. The fluid machine according to claim 2, wherein a portion of air flowing toward a vehicle fuel cell flows into the cooling passage as gas.

* * * * *